United States Patent [19]

Shriver et al.

[11] Patent Number: 5,497,069
[45] Date of Patent: Mar. 5, 1996

[54] SHOCK LOAD STABILIZATION CIRCUIT AND VOLTAGE REGULATOR HAVING SAME

[75] Inventors: Michael H. Shriver, Rockford; Rich A. Helm, Crystal Lake, both of Ill.

[73] Assignee: Sundstrand Corporation, Rockford, Ill.

[21] Appl. No.: 265,305

[22] Filed: Jun. 24, 1994

[51] Int. Cl.$^6$ ..................................................... H02H 7/06
[52] U.S. Cl. .................................................. 322/19; 322/59
[58] Field of Search .................................. 322/19, 24, 56; 364/492; 307/19

[56] References Cited

U.S. PATENT DOCUMENTS

| | | | |
|---|---|---|---|
| 4,044,296 | 8/1977 | Dhyanchand | 322/25 |
| 4,326,159 | 4/1982 | Aotsu et al. | 322/19 |
| 4,335,344 | 6/1982 | Gant | 322/25 |
| 4,403,292 | 9/1983 | Ejzak | 364/492 |
| 4,442,396 | 4/1984 | Hucker | 322/21 |
| 4,477,765 | 10/1984 | Glennon et al. | 322/20 |
| 4,559,487 | 12/1985 | Sims et al. | 322/24 |
| 4,567,422 | 1/1986 | Sims | 322/25 |
| 4,855,664 | 8/1989 | Lane | 322/19 |
| 4,988,941 | 1/1991 | Fox | 322/28 |
| 5,017,857 | 5/1991 | Fox | 322/25 |

*Primary Examiner*—Steven L. Stephan
*Assistant Examiner*—Nicholas Ponomarenko
*Attorney, Agent, or Firm*—Jeffery J. Makeever

[57] ABSTRACT

An electronic voltage regulator for generators controlled by means of an exciter field current, comprises an average voltage sensing circuit connected to the output of the generator, a peak voltage sensing circuit connected to the output of the generator, an error signal circuit operatively connected to the average voltage sensing and the peak voltage sensing circuits effective to generate an error signal when the generator's average output voltage varies from a predetermined value or when the peak voltage exceeds a predetermined limit, an exciter field current control circuit operatively connected to the error signal circuit effective to control the generator field current in response to the error signal, and a shock load stabilization circuit operatively connected to the average voltage sensing circuit and to the peak voltage sensing circuit effective to disable the peak voltage sensing circuit upon sensing an application of a shock load to the generator. The shock load stabilization circuit comprises a shock load sense circuit effective to generate a control signal upon detection of a shock load application, a timed discharge circuit connected to the shock load sense circuit, effective to disable the peak voltage sensing circuit, and a re-trigger delay circuit interposed between the shock load sense circuit and the timed discharge circuit communicating the control signal to the timed discharge circuit upon its initial generation, and to disable communication of subsequently generated control signals until expiration of a predetermined time interval.

10 Claims, 7 Drawing Sheets

SHOCK LOAD STABILIZATION CIRCUIT AND VOLTAGE REGULATOR HAVING SAME

FIELD OF THE INVENTION

The instant invention relates to voltage regulators, and more particularity to a voltage regulator circuit to stabilize a voltage regulator having average and peak regulation circuitry under shock loading conditions.

BACKGROUND ART

Electric power generation systems, such as that illustrated in FIG. 1 and manufactured by the assignee of the instant application for use on aircraft, typically comprise at least one generator 10 coupled through a generator relay (GR) 12 to a load distribution bus 14, to which aircraft utilization equipment is coupled. Preferably, more than one generator is utilized to allow multiple sources of electrical energy to power multiple load buses through bus tie relays (BTRs) 16 and a cross tie relay (XTR) 18. Additionally, a complete electrical power generation system comprises an auxiliary source of electrical energy 20 as well as an external source of electrical energy 22 capable of being coupled to the load distribution buses 14. The typical electrical power generation system utilizes three phase electrical power.

The electrical power supplied to the various pieces of utilization equipment coupled to the load buses may be separately controlled, or it may be simply hard wired from the bus. In either case, connection of the electrical load to the bus represents a shock load condition to the generator. Typically the shock load condition does not affect the power quality output of the generator; however, for certain conditions, such as energization of entire load buses through the BTRs and XTR, or emergency energization of all fuel pumps, the shock load to the generator may be such as to cause the voltage to droop to an unacceptable level.

The output voltage and current of each generator 10 is controlled by a generator control unit 24 which comprises a voltage regulator circuit, such as is shown in the simplified block diagram of FIG. 2. This typical voltage regulator arrangement regulates the generator output voltage based on an OR'd combination of an Average 26 and a Peak 28 voltage sense circuit. Other parameters 30 may be used by the regulator, such as generator phase current, as required by the specific application and stability requirements. These signals, as well as a reference 32 are processed by a summing amplifier 34, the output of which controls the pulse width modulator 36 based on the reference 32. The pulse width modulator 36 pulses current through the generator exciter field 38 from a source of high voltage dc, such as the rectified output of a permanent magnet generator, to control the output voltage of the generator at a point of regulation. A more detailed description of a voltage regulator utilizing both average and peak voltage sensing may be found in U.S. Pat. No. 4,044,296 granted to Dhyanchand et al. and which is incorporated herein by reference.

Under normal steady-state load conditions the generator three-phase voltage is regulated by the average voltage sensing circuit 26 contribution to the exciter field pulse width modulator 36. The peak voltage sensing circuit 28 is necessary for voltage regulation during unbalanced load conditions to ensure that no single phase exceeds a predetermined threshold, even though the average of the three droops. The peak sensing circuit 28 contributes to the pulse width modulation of the exciter field 38 during periods when one of the three phase voltages is significantly higher than the other two and the average of the three-phase voltage is less than the scaled peak of the highest phase voltage, or when one phase droops low such that the average voltage droops below that of the peak sense signal. When the peak sensing circuit 28 output overcomes the average sensing circuit 26 output, the signal to the summing amplifier 34 is increased, which decreases the pulse width modulation duty cycle. A reduction of the pulse width modulation duty cycle will decrease the effective dc current through the exciter field 38, thereby decreasing the excitation to the generator and lowering the three-phase voltage output.

Filtering resistor-capacitor time constant circuits are included in the average voltage sensing circuit 26 and the peak sensing circuit 28 to smooth out transient inputs, and to adjust the sense circuit responses to different input voltage conditions. The highest phase input of the peak sensing circuit 28 is held by a capacitor which is tuned with its resistor to provide an output with minimum ripple and adequate discharge rate. However, since the output of this circuit 28 is based on the highest single phase voltage, as opposed to the average of three voltages, its resistor-capacitor time constant is longer than that of the average voltage sensing circuit 26 to prevent a single phase from exceeding the maximum allowable level for any single phase.

During large shock loading conditions, as represented by the step increase of signal 40 of FIG. 3, the regulated three-phase voltage 48 decreases. The output of the average voltage sensing circuit 42 also decreases, as does the output of the peak voltage sensing circuit 44. Initially, based on this decrease the effective exciter field control current 46 increases in an attempt to maintain the output voltage at the correct level. However, due to the different resistor-capacitor time constants for the average and the peak sensing circuits required to meet other system parameters, the output of the peak sensing circuit 44 decays more slowly than the output of the average sensing circuit 42. As the output of the average sensing circuit 42 drops below the output of the peak sensing circuit 44, the peak sensing circuit assumes control of the pulse width modulation, and does not allow the duty cycle to increase at a rate sufficient to adjust for the decrease in the generator output voltage. This results in the three phase voltage drooping below a predetermined acceptable level before recovering from the transient. Attempts to solve this problem have included adjusting the resistor-capacitor time constants of these two circuits, but this leads to unacceptable ripple voltage in the normal modes of operation. The addition of pre- and post-loading on the generators has also been tried to try to minimize the effect of the shock loading conditions.

The instant invention is directed at overcoming this shock loading voltage droop problem while not affecting normal operation of the voltage regulator or steady-state output voltage quality.

SUMMARY OF THE INVENTION

It is a primary objective to provide a new and improved electronic voltage regulator for generators having exciter fields. More specifically, it is a primary objective to provide a voltage regulator which stabilizes the output of a generator within predetermined limits during the application of shock loads. It is also a primary objective to provide a circuit for stabilizing electronic voltage regulators during application of shock loads. Further, it is a primary objective to provide a method of stabilizing voltage regulators during application of shock loads.

In a preferred embodiment, an electronic voltage regulator for generators controlled by means of an exciter field current comprises an average voltage sensing circuit connected to the output of the generator, a peak voltage sensing circuit connected to the output of the generator, an error signal circuit operatively connected to the average voltage sensing and the peak voltage sensing circuits effective to generate an error signal when the generator's average output voltage varies from a predetermined value or when the peak voltage exceeds a predetermined limit, an exciter field current control circuit operatively connected to the error signal circuit effective to control the generator field current in response to the error signal, and a shock load stabilization circuit operatively connected to the average voltage sensing circuit and to the peak voltage sensing circuit effective to disable the peak voltage sensing circuit upon sensing an application of a shock load to the generator.

In a highly preferred embodiment, the shock load stabilization circuit comprises a shock load sense circuit effective to generate a control signal upon detection of a shock load application, a timed discharge circuit connected to the shock load sense circuit effective to disable the peak voltage sensing circuit, and a re-trigger delay circuit interposed between the shock load sense circuit and the timed discharge circuit communicating the control signal to the timed discharge circuit upon its initial generation, and to disable communication of subsequently generated control signals until expiration of a predetermined time interval.

A preferred method of stabilizing the electronic voltage regulator during application of shock loads to the generator output comprises the steps of sensing the application of a shock load to the generator output, thereafter disabling the peak voltage regulation circuit for a first predetermined period of time, and thereafter inhibiting the disabling of the peak voltage regulation circuit step for a second predetermined time after the expiration of the first predetermined period of time.

BRIEF DESCRIPTION OF DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
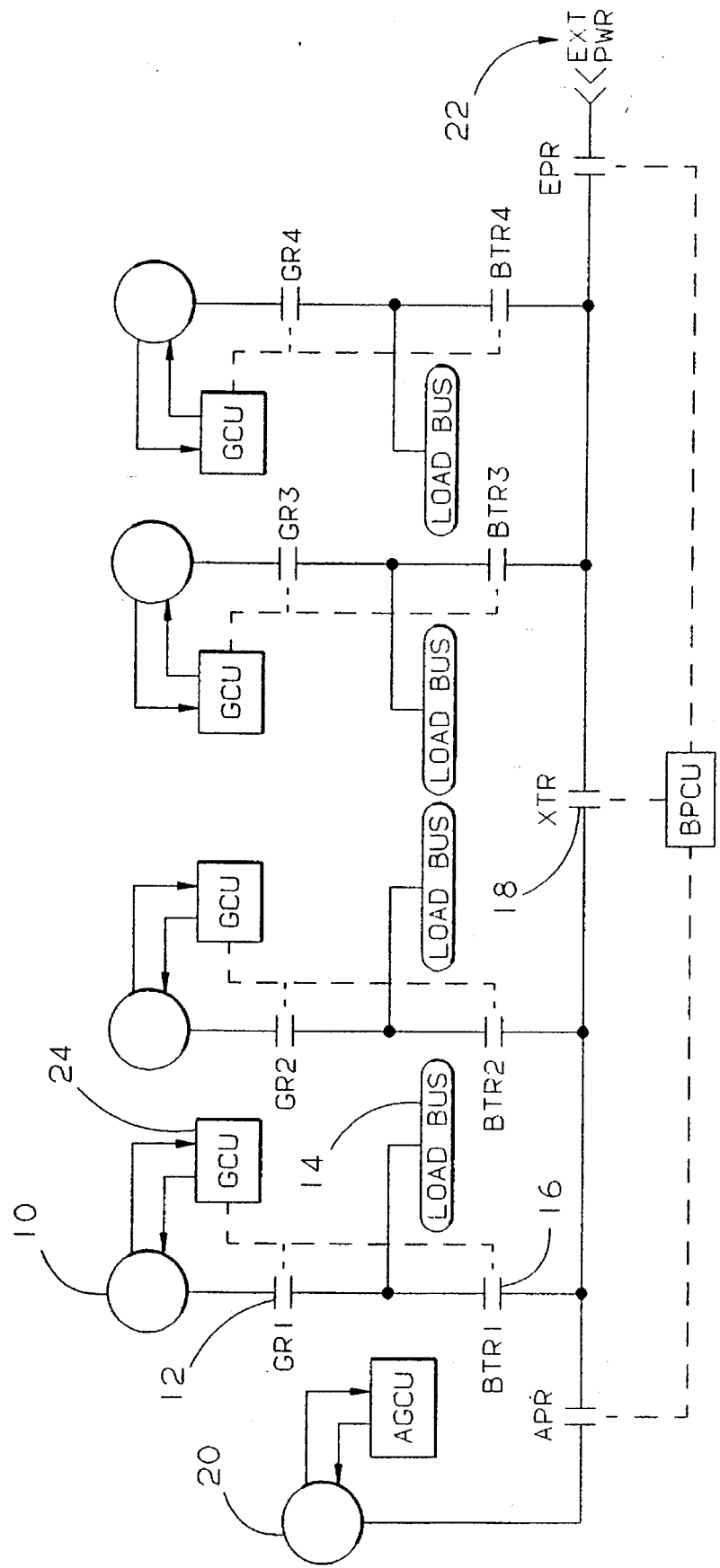
FIG. 1 is a single line diagram of an electrical power generation system manufactured by the assignee of the instant invention.
Figure 2:
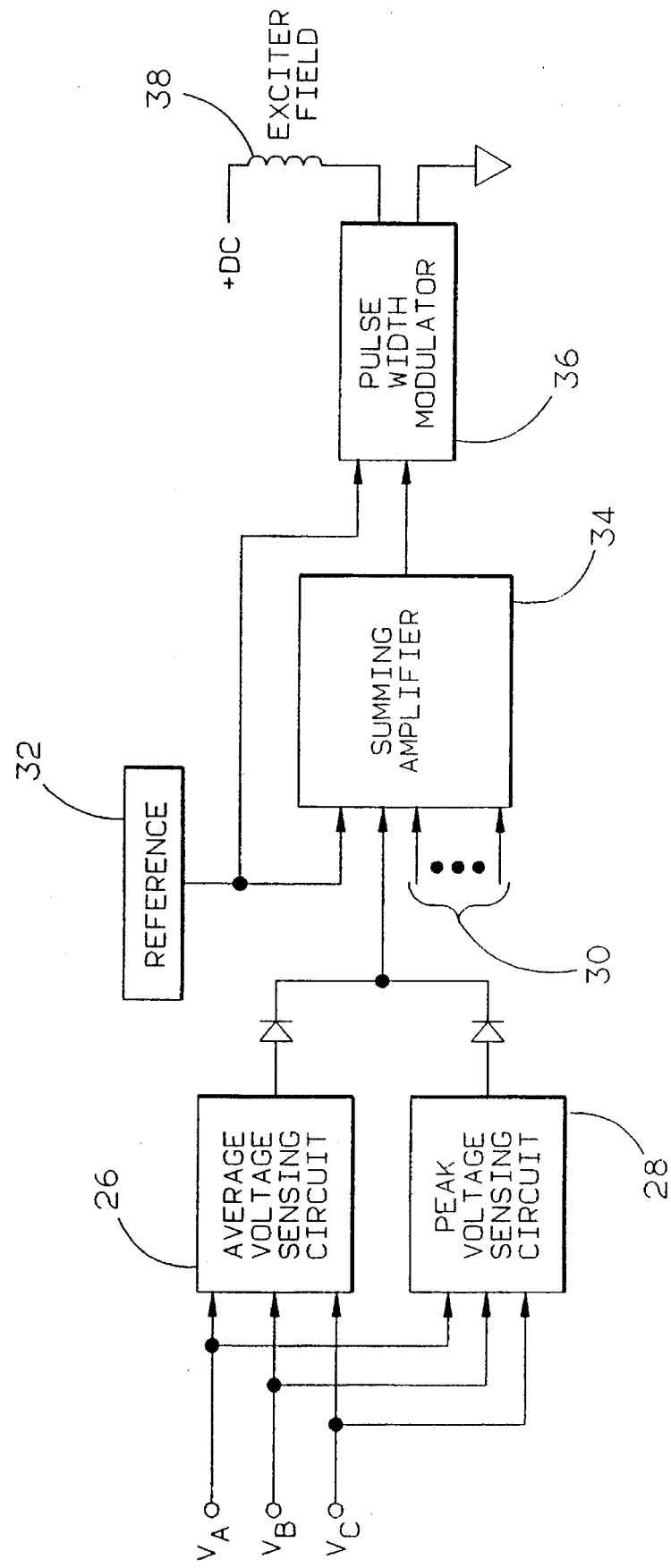
FIG. 2 is a simplified block diagram of a prior art voltage regulator having average and peak voltage regulation circuits.

A typical electrical generation system suitable for use in an aircraft and to which the instant invention is particularly well suited is illustrated in FIG. 1 and is as described above. As is well understood by one skilled in the art, the typical generator 10 in such a system generates a three phase output which is coupled to load distribution buses 14 by generator relays 12 and to other load distribution buses by bus tie relays 16 and cross tie relays 18. The electrical output of the generator 10 is controlled by a generator control unit 24 in which is contained a voltage regulator which is the subject of the instant application. As is understood in the art, electrical loads are applied to the generator in steps, some small and some large. The large step load applications are typically referred to as shock load applications due to the sudden nature of the event. To enable the utilization equipment to perform properly, the generator 10 output voltage must remain within certain limits during operation, including operation during shock load applications. It is the function of the voltage regulator to control the output voltage of the generator 10 within these limits. A voltage regulator which can maintain the generator output within prescribed limits even during shock load applications, a circuit for enabling such operation, and a method of same are the subjects of this application.

Figure 4:
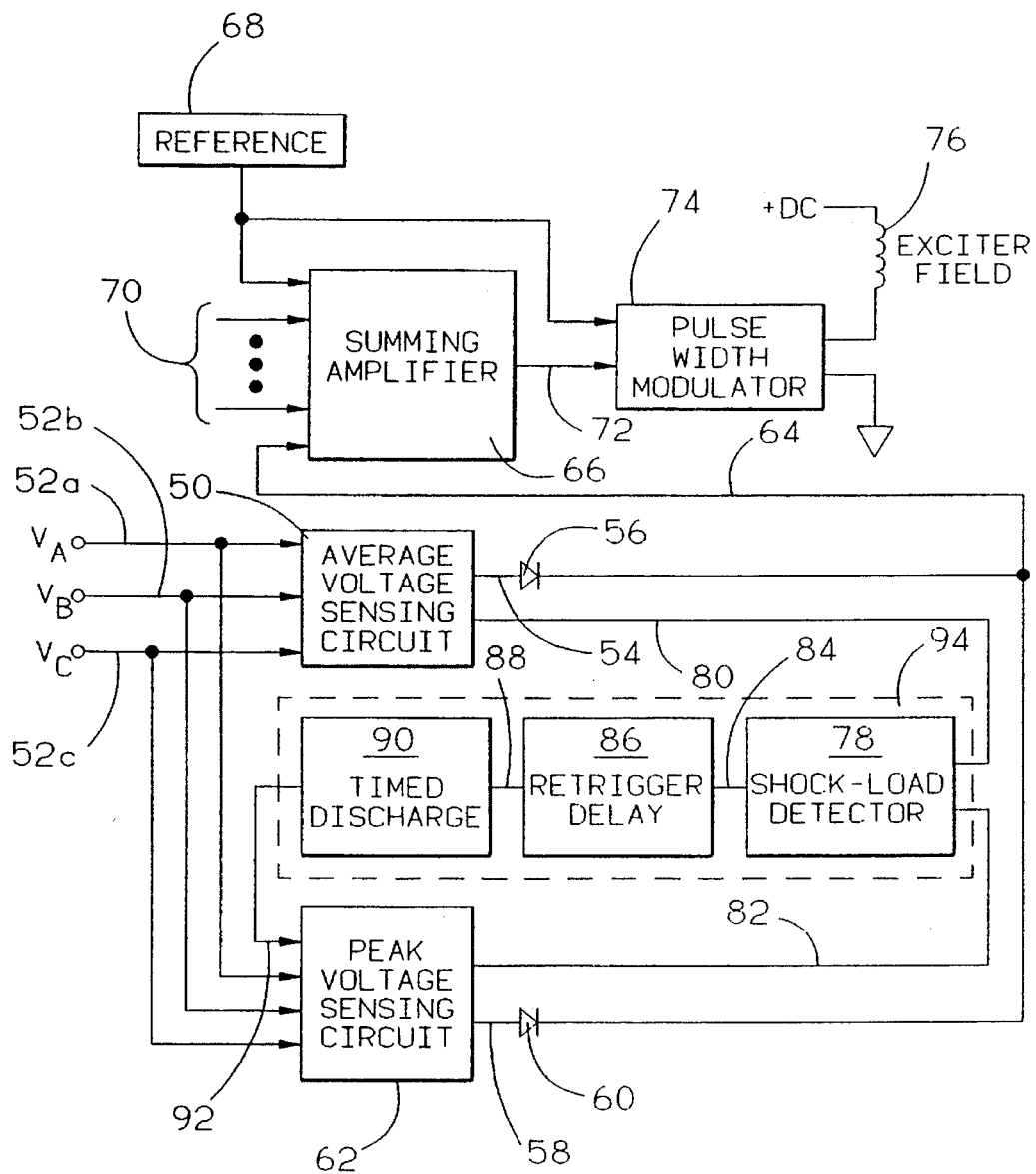
FIG. 4 is a block diagram of a voltage regulator in accordance with the instant invention.

In a preferred embodiment of the voltage regulator of the instant invention, as shown in the block diagram of FIG. 4, an average voltage sensing regulation circuit 50 is coupled to the output 52a, 52b, 52c of a generator (not shown). The output 54 of the average voltage sensing circuit 50 is OR'd by diodes 56 and 60 with the output 58 of a peak voltage sensing regulation circuit 62, which also is coupled to the output 52a, 52b, 52c of the generator. This OR'd regulation signal 64 is input to a summing amplifier 66 which, in addition to a voltage reference signal 68, may receive additional inputs 70 from additional regulation circuits depending on the specific application. The output 72 of the summing amplifier 66 is input to a pulse width modulation circuit 74 which controls the dc current flow through the generator's exciter field 76. In the preferred embodiment, a shock load detector circuit 78 receives an input 80 from the average voltage sensing circuit 50, and an input 82 from the peak voltage sensing circuit 62. The output 84 from the shock load detector is coupled to a re-trigger delay circuit 86, whose output 88 is coupled to a timed discharge circuit 90. The output 92 from the timed discharge circuit 90 is input to the peak voltage sensing circuit 62.

During normal steady-state operation of the voltage regulator, the output 54 of the average voltage sensing circuit 50 is greater than that of the peak voltage sensing circuit 62, and therefore, controls the output of the generator. The average voltage output 54 via line 64 is compared to a reference value 68 by the summing amplifier 66. The output error signal 72 is used by the pulse width modulator 74 to adjust the effective current through the exciter field 76 to adjust the output voltage of the generator. If the output 54 drops, indicating a lower than desired average generator output voltage, the pulse width modulator 74 increases the duty cycle of the pulse width modulation to provide more excitation to the generator in an effort to increase the average output voltage from the generator. If the output 54 increases, indicating a higher than desired average generator output voltage, the pulse width modulator 74 decreases the duty cycle of the pulse width modulation to provide less excitation to the generator in an effort to decrease the average output voltage from the generator. This operation continues to maintain the generator output voltage at the desired level over the expected load range of the generator.

During operation of the generator, unbalanced loading situations may occur which cause one or more of the phase voltages to increase with a corresponding decrease in other phase voltages. The net effect of such a situation is that, while the average generator output voltage may remain constant or even decrease, at least one phase voltage will exceed a desired limit. Since many pieces of utilization equipment only draw power from one phase, a single high phase could be devastating to the equipment, even though the average output voltage does not exceed the limit. To accommodate this situation, the voltage regulator utilizes a peak voltage sensing circuit 62 which will assume control of the regulation when its output 58 exceeds that of the average voltage sensing circuit through the action of diodes 56 and 60. As the peak voltage rises on any phase 52a, 52b, or 52c, the output 58 increases and assumes control of the regulation via line 64 to the summing amplifier 66. The difference between this highest peak phase voltage and the reference 68 is communicated via line 72 to the pulse width modulator 74, which then reduces the duty cycle to lower the output voltage of the generator. If the highest phase voltage decreases, but still remains greater than the average, the pulse width modulator 74 will increase the duty cycle to increase the output voltage of the generator. In effect, the voltage regulator is now regulating off the highest phase voltage. Because of this, the peak voltage sensing circuit 62 must hold that highest phase's peak value until the cycle repeats to avoid unwanted ripple in the generator output due to variations of the duty cycle caused by regulation based only on one phase.

Figure 3:
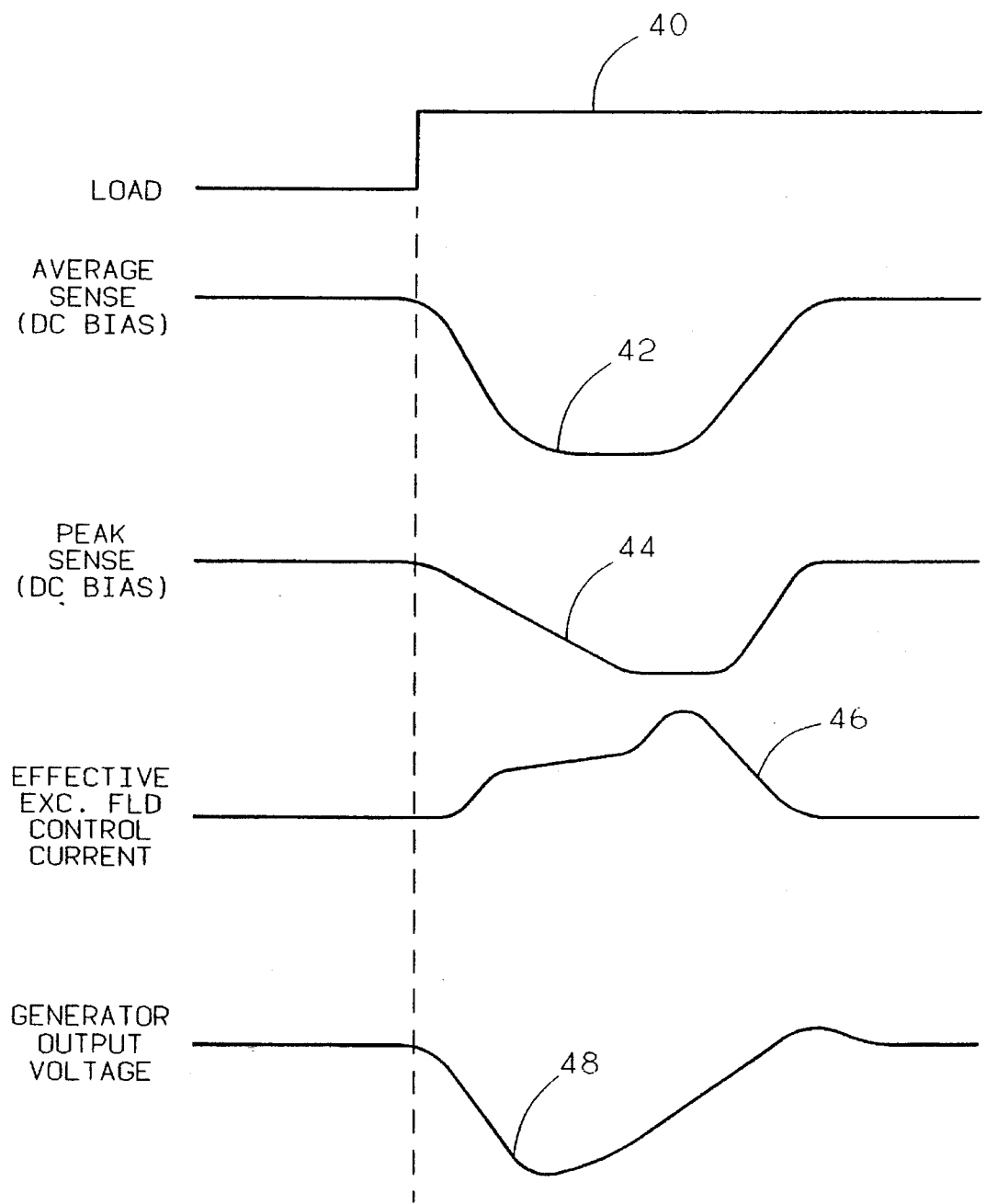
FIG. 3 is a waveform diagram during a shock loading condition of the prior art voltage regulator of FIG. 2.

During shock load applications, however, the peak hold requirements of the high phase regulation circuitry 62 results in a greater than desired droop in generator output voltage. Typically, prior to the shock loading event the voltage regulator is regulating based on the average voltage regulation circuitry 50. Upon application of the shock load, the voltage on all generator output phases 52a, 52b, and 52c droops. The magnitude of the droop is dependant on the magnitude of the shock load. The output 54 of the average voltage sensing circuit 50 decreases as a result. This decrease in the output 54 should result in an increase in the duty cycle of the pulse width modulation through the exciter field 76, as described above, to increase the output voltage of the generator and maintain it within predefined limits. Operation of the average 50 and peak 62 circuits alone, however, as described above and with reference to FIG. 3, results in a slower than desired increase in the duty cycle with a resulting greater than desired output voltage droop.

In the preferred embodiment of the instant invention, however, a circuit 94 to stabilize the generator voltage regulator during shock loading conditions comprising a means for sensing a shock load application, as illustrated in FIG. 4 by the shock load detector circuit 78, and a means for disabling the peak voltage regulation circuit of the voltage regulator, as illustrated by the timed discharge circuit 90 is provided. To prevent undesired oscillation of this circuit 94, means, as illustrated by the re-trigger delay circuit 86, for re-enabling operation of the timed discharge circuit 90 after a predetermined time interval once the timed discharge circuit 90 has operated is also provided. Upon application of the shock load, the output 80 from the average voltage sensing circuit 50 decreases rapidly. The output 82 from the peak voltage sensing circuit 62, however, decays much more slowly due to its peak holding requirements. As the shock load detector circuit 78 senses that the peak circuitry output 82 is exceeding the average circuitry output 80, it generates an output control signal on line 84. The timed discharge circuit 90, in response, disables the peak voltage sensing circuit 62 for a predetermined period of time and causes the generator to regulate to the average voltage sensing which will cause it to recover from the shock load condition more quickly. Once the timed discharge circuit 90 has disabled the peak voltage sensing circuit 62, the timed discharge is not re-enabled until a predetermined time interval, as calculated by the re-trigger delay circuit 86, has passed.

Figure 5:
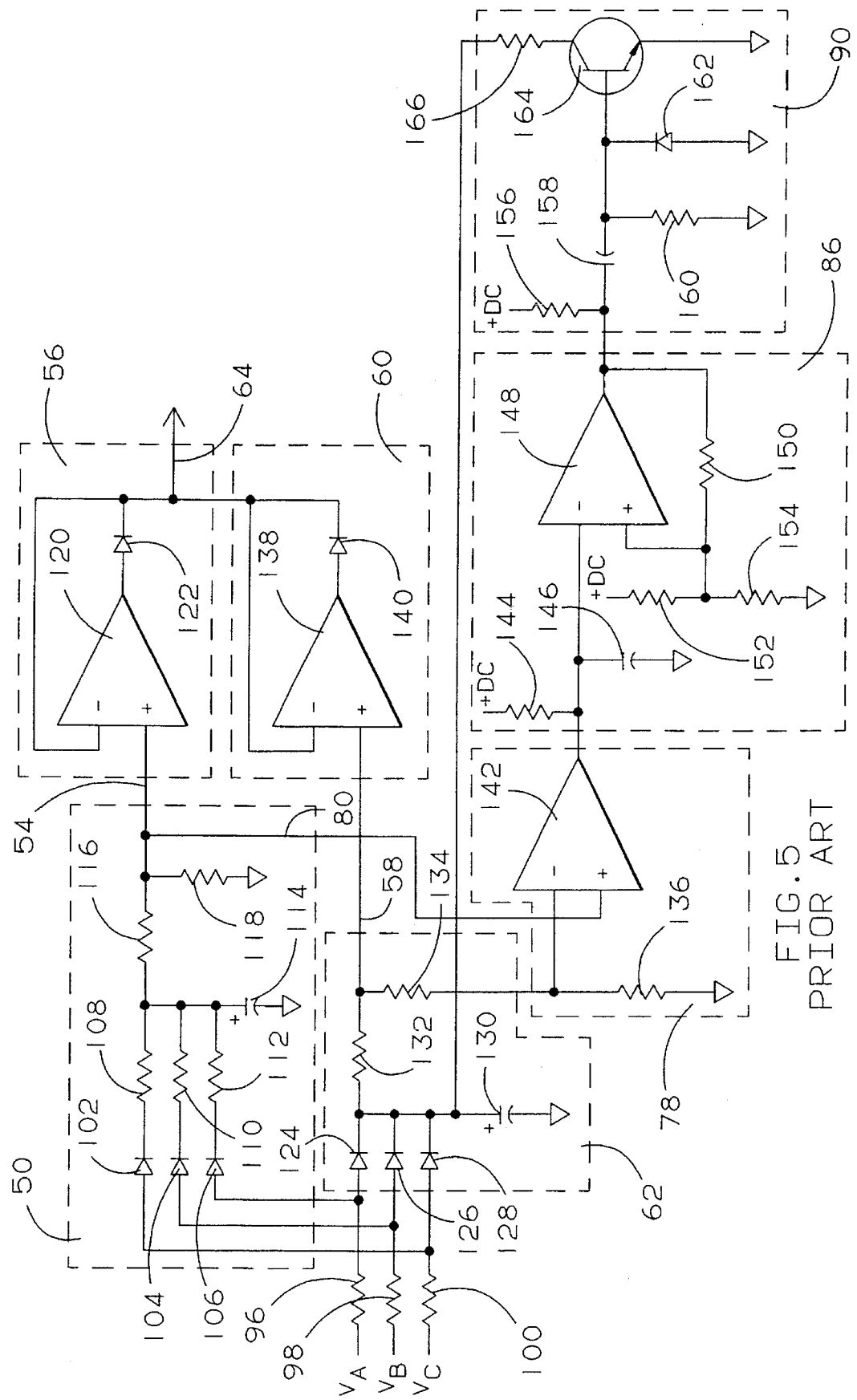
FIG. 5 is a schematic diagram of the shock load stabilization circuit in accordance with the instant invention.

As illustrated in detail in FIG. 5, the three phase voltages 52a, 52b, and 52c are input to the voltage regulator through resistors 96, 98, and 100. The average sense circuit 50 comprises diodes 102, 104, and 106 in series with resistors 108, 110, and 112, which input to charge capacitor 114. The discharge of capacitor 114 is effectuated through resistors 116 and 118. The output 54 of the average sensing circuit 50 is input to the ideal diode configuration 56 comprising operational amplifier 120 and diode 122. The peak voltage sensing circuit 62 inputs the three phase voltages 52a, 52b, and 52c through resistors 96, 98, and 100, and diodes 124, 126, and 128 to charge capacitor 130 directly to more closely track and hold the peak voltage levels. The discharge of capacitor 130 is facilitated through resistors 132, 134, and 136. The resistive-capacitive buffering is chosen to result in a rapid charge but a slow discharge of capacitor 130. The output 58 of the peak voltage sensing circuit 62 is input to the ideal diode configuration 60 comprising operational amplifier 138 and diode 140. The diode OR'd output 64 of these two circuits is then input to the summing amplifier 66 of FIG. 4.

The circuit to stabilize the voltage regulator during shock load applications is also shown in detail in FIG. 5. The input 80 from the average voltage sensing circuit 50 is coupled to the (+) input of comparator 142 which comprises the shock load sense circuit 78. Resistors 134 and 136, in addition to providing the discharge path for capacitor 130 during normal operation, establish means for shifting the level of the output 82 to ensure proper detection of the shock load application. This level shifted signal is input to the (−) input of comparator 142. The re-trigger delay circuit 86 comprises a resistor 144 and capacitor 146 input to the (−) input to a comparator 148 having a feedback resistor 150 and a reference established by resistors 152 and 154 to the (+) input. The timed discharge circuit 90 comprises resistor 156, capacitor 158, resistor 160, and diode 162 input to the base of transistor 164. Resistor 166 provides a controlled discharge of capacitor 130 of the peak sensing circuit 62 through transistor 164.

This stabilization circuit operates as a shock load is applied to the system and the (−) input to comparator 142 becomes greater than the (+) input. The comparator 142 changes the output state from open to ground. The capacitor 146 quickly discharges through the comparator 142 output, bringing the (−) input of comparator 148 lower than the reference established by resistors 152 and 154 at the (+) input. At this point the comparator 148 output will go from ground to a high impedance state. When the comparator 148 output goes to a high impedance state, the resistor 156 will route current through capacitor 158 into the base of transistor 164, turning this transistor switch on. The transistor 164 will remain on until the capacitor 158 becomes completely charged which is a predetermined time interval of preferably 1 millisecond. While on, transistor 164 will discharge the peak sense capacitor 130 through resistor 166. The discharge time constant is established by the resistor 166 capacitor 130 product. After capacitor 130 has discharged, the circuit will not re-arm until the comparator 142 output goes high long enough for current through resistor 144 to charge capacitor 146 above the reference established by resistors 152 and 154. This predetermined time interval is preferably 10 milliseconds. When this happens, comparator 148 output goes low, discharging capacitor 158 through resistor 160. At this point the circuit is ready for another peak sense capacitor discharge.

Figure 6:
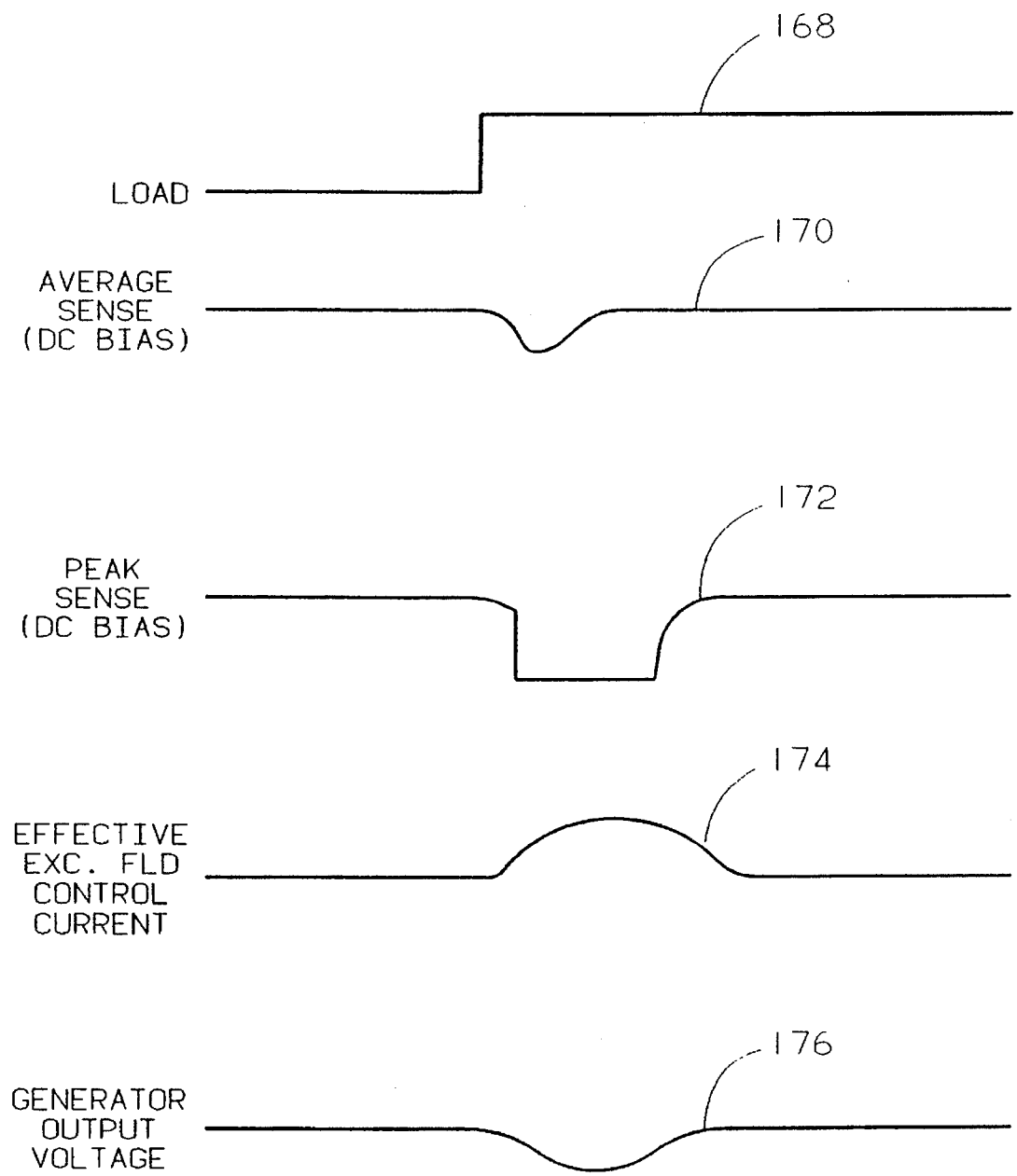
FIG. 6 is a waveform diagram during a shock loading condition of the voltage regulator of FIG. 4 in accordance with the instant invention.

The response of the generator output voltage as controlled by the instant invention is illustrated in FIG. 6. Upon application of the shock load, as indicated by the step increase in signal 168, the generator output voltage 176 begins to droop, as does the output of the average voltage sensing circuit 170 and the output of the peak voltage sensing circuit 172. As a result, the effective exciter field control current 174 begins to increase in an effort to maintain the generator output voltage at the desired level. As described above, due to the different resistive-capacitive buffering requirements of the two regulation circuits, the average sense signal 170 will drop below the peak sense signal 172. At that point, however, the stabilization circuit of the instant invention will disable the peak sense circuit, as indicated by the step decrease in signal 172, and allow the average voltage sensing circuit to maintain control of the regulation. The result is a small droop in generator output voltage 176 due to the shock load application which is within the acceptable limits determined for the electrical power generation system.

Figure 7:
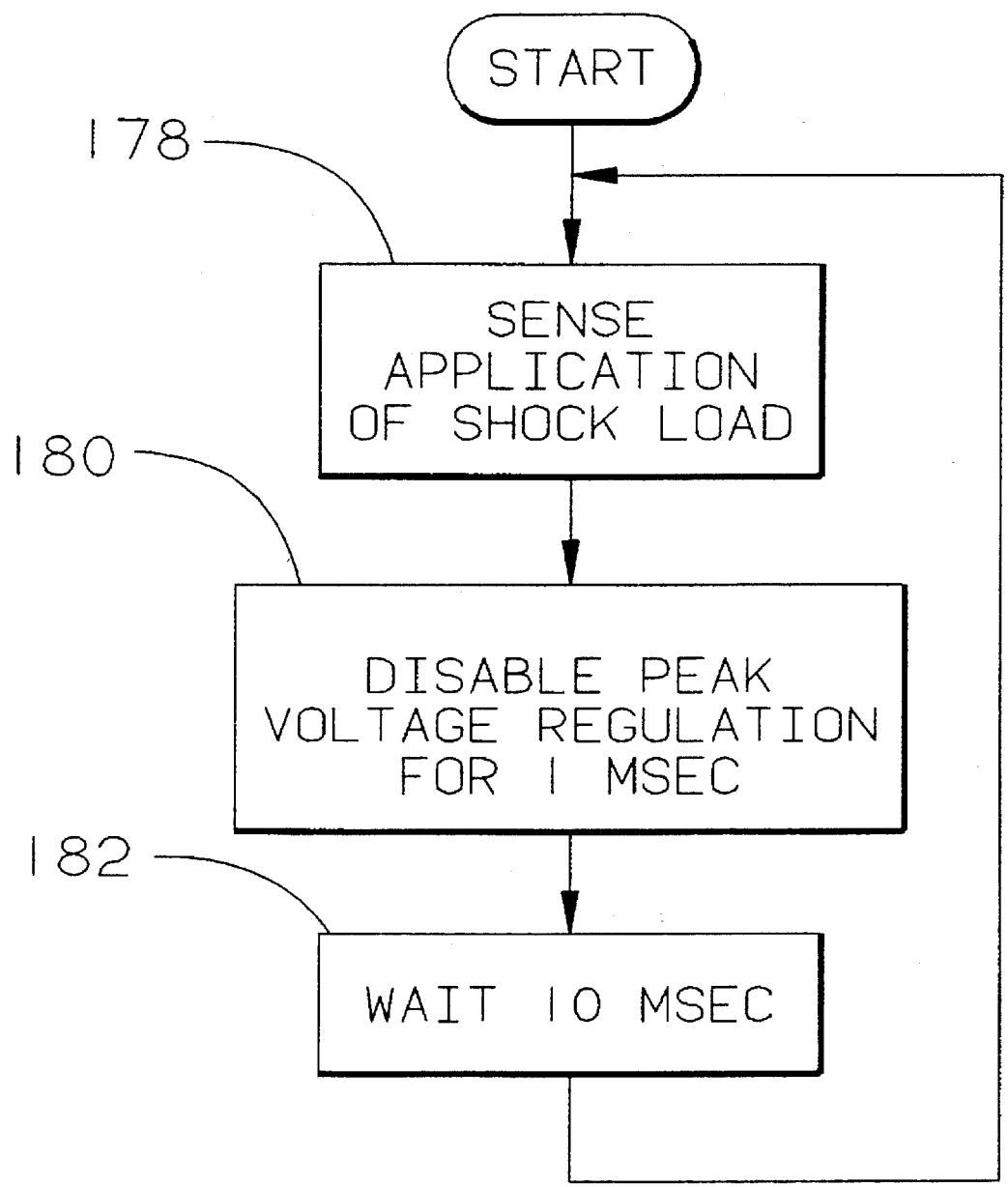
FIG. 7 is a flow diagram illustrating a method in accordance with the instant invention.

While the above description describes a preferred embodiment of the instant invention, the preferred method of stabilizing an electronic voltage regulator for a generator during application of shock loads to the generator output, as represented in FIG. 7, comprises the steps of sensing the application of a shock load to the generator output 178, thereafter disabling the peak voltage regulation circuit for a first predetermined period of time 180, and thereafter inhibiting the disabling of the peak voltage regulation circuit step for a second predetermined time after the expiration of the first predetermined period of time 182. In a preferred method the first period of time will be less than 5 milliseconds and the second period of time will be between 5 milliseconds and 20 milliseconds. In a highly preferred embodiment the first period of time will preferably be 1 millisecond, and the second preferably 10 milliseconds.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A circuit to stabilize a generator voltage regulator during shock loading conditions, the voltage regulator having average and peak voltage regulation circuits, each having a resistive-capacitive buffer of different time constants, comprising:

means for sensing a shock load application, said sensing means generating an output control signal upon detection of the shock load application; and means responsive to said output control signal for disabling the peak voltage regulation circuit of the voltage regulator.

2. The circuit of claim 1, wherein said means for sensing a shock load application comprises a comparator having a first and a second input, and an output, said first input being coupled to an output from the average voltage regulation circuit and said second input being coupled to an output from the peak voltage regulation circuit, said comparator generating said output control signal on said output upon sensing a second signal magnitude on said second input exceeding a first signal magnitude on said first input.

3. The circuit of claim 2, further comprising means interposed between said second input and the output from the peak voltage regulation circuit for shifting the level of said second signal magnitude to ensure that said output control signal is generated only during shock load applications.

4. The circuit of claim 3, wherein said level shifting means reduces said second signal magnitude.

5. The circuit of claim 1, wherein said means for disabling the peak voltage regulation circuit comprises means for discharging the capacitive element of the resistive-capacitive buffer of the peak voltage regulation circuit, and means controllably coupled to said discharging means for timing the duration of discharge, said timing means disabling said discharging means upon expiration of a predetermined time interval.

6. The circuit of claim 1, further comprising re-trigger delay means coupled to said means for disabling the peak voltage regulation circuit for re-enabling operation of said means for disabling the peak voltage regulation circuit upon expiration of a predetermined time interval after the peak voltage regulation circuit has been disabled by said means for disabling the peak voltage regulation circuit.

7. An electronic voltage regulator for generators controlled by means of an exciter field current, comprising:

an average voltage sensing circuit connected to the output of the generator;

a peak voltage sensing circuit connected to the output of the generator;

an error signal circuit operatively connected to said average voltage sensing and said peak voltage sensing circuits effective to generate an error signal when the generator's average output voltage varies from a predetermined value or when the generator's peak voltage exceeds a predetermined limit;

an exciter field current control circuit, operatively connected to said error signal circuit effective to control the generator field current in response to said error signal; and a shock load stabilization circuit operatively connected to said average voltage sensing circuit and to said peak voltage sensing circuit effective to sense an application of a shock load to the generator and to disable said peak voltage sensing circuit thereupon.

8. The voltage regulator of claim 7, wherein said shock load stabilization circuit comprises:

a shock load sense circuit effective to generate a first control signal upon detection of a shock load application to the generator;

a timed discharge circuit operatively connected to said shock load sense circuit, effective to disable said peak voltage sensing circuit upon receipt of said first control signal; and a re-trigger delay circuit operatively interposed between said shock load sense circuit and said timed discharge circuit effective to communicate said first control signal from said shock load sense circuit to said timed discharge circuit upon initial generation of said first control signal, and to disable communication of subsequently generated first control signals until expiration of a predetermined time interval after an initial generation of said first control signal.

9. The voltage regulator of claim 8, wherein said shock load sense circuit includes a level shifting circuit operatively interposed between said peak voltage sensing circuit and said shock load sensing circuit effective to ensure generation of said first control signal only upon application of shock loads to the generator.

10. A method of stabilizing an electronic voltage regulator for a generator during application of shock loads to the generator output, the voltage regulator having average and peak voltage regulation circuits, comprising the steps of:

(a) sensing the application of a shock load to the generator output; thereafter (b) disabling the peak voltage regulation circuit for a first predetermined period of time; and thereafter (c) inhibiting said disabling of the peak voltage regulation circuit step for a second predetermined time after the expiration of said first predetermined period of time.

* * * * *